United States Patent [19]

Okada

[11] 3,740,459

[45] June 19, 1973

[54] AUTOMATIC TINT CONTROL CIRCUIT

[75] Inventor: Hisao Okada, Midori-ku, Yokohama-shi, Kanagawa, Japan

[73] Assignee: Sony Corporation, Tokyo, Japan

[22] Filed: Sept. 27, 1971

[21] Appl. No.: 183,803

[30] Foreign Application Priority Data

Sept. 25, 1970 Japan .............................. 45/83882

[52] U.S. Cl. .......................................... 178/5.4 HE

[51] Int. Cl. ............................................ H04n 9/12

[58] Field of Search..................... 178/5.4 R, 5.4 HE

[56] References Cited

UNITED STATES PATENTS 3,649,748 3/1972 Knauer ......................... 178/5.4 HE

*Primary Examiner*—Robert L. Richardson

*Attorney*—Lewis H. Eslinger, Alvin Sinderbrand et al.

[57] ABSTRACT

An automatic tint control circuit for a color television receiver adapted for reception of a composite color television signal containing a chrominance signal, the phase and level of which represent hue and color saturation, respectively. The circuit automatically imparts a phase corresponding to proper flesh tone to a chrominance signal which has a phase in a predetermined phase area that includes the phase of flesh tone and which has a signal level lower than a predetermined value.

6 Claims, 15 Drawing Figures

INVENTOR
HISAO OKADA

INVENTOR
HISAO OKADA

INVENTOR
HISAO OKADA

INVENTOR
HISAO OKADA

AUTOMATIC TINT CONTROL CIRCUIT

BACKGROUND OF THE INVENTION

1. Field of the Invention

This invention relates generally to a chrominance signal control circuit for a color television receiver, and more particularly to an automatic tint control circuit which operates to provide color images on the screen with proper flesh tone automatically.

2. Description of the Prior Art

The modulated chrominance signal component of a color television signal represents hue with its phase and saturation with its amplitude to transmit color information, but the chrominance signal component is subjected to various distortions while being transmitted. The change in phase is noticeable because, when the chrominance signal component subjected to a phase distortion is received by a color television receiver to reproduce color images thereon, the reproduced images lose proper colors and become indistinct. This is especially noticeable in the case of flesh tones, which take on an unnatural look when there is even a slight deviation of hue. Further, flesh tone becomes unnatural-looking depending upon the characteristic of a color television camera and conditions for picking up images, and accordingly the color television receiver requires manual hue control with a control knob.

To avoid this, an automatic flesh tone control system has heretofore been proposed by means of which when the hue of flesh tone is shifted from its proper value, it is automatically corrected to a predetermined flesh tone hue. With this prior art system, a signal component corresponding to the flesh tone contained in the transmitted color television signal and signal components adjacent to the aforementioned one are compared in phase with a standard signal of a predetermined phase to obtain a correcting signal, and these signal components are corrected by the correcting signal to be of a proper flesh tone phase. The flesh tone is determined by the phase and saturation of the modulated chrominance signal component. In the above case, however, the signal corresponding to the flesh tone which is to be corrected and other signals of the same phase or a phase adjacent thereto, but which is to represent some other tint, are not distinguished, so that the signal naturally representing a tint similar to the flesh tone is changed to the predetermined flesh tone phase. This leads to a loss of diversity of colors in the reproduced color images, and hence results in deterioration of the color images.

SUMMARY OF THE INVENTION

This invention is directed to an automatic tint control system which overcomes such defects experienced in the prior art. Signals representing flesh tones are lower in saturation than signals representative of other tints. For example, if the saturation of a signal representative of the brightest red is assumed to be 100 percent, the saturation of the signal representing a flesh tone is lower than about 30 percent. Accordingly, the signal of the phase corresponding to the flesh tone and that of a phase adjacent thereto whose saturation is higher than about 30 percent are maintained unchanged and only a signal which is of a phase adjacent to that corresponding to a flesh tone but lower in saturation than about 30 percent is corrected. As a result, proper flesh tones can be obtained without impairing color diversity of the reproduced color images.

Accordingly, it is a main object of this invention to reproduce color images with excellent quality on the screen of a color television receiver.

Another object of this invention is to provide an automatic tint control circuit for a color television receiver which automatically changes the phase of certain chrominance signals received by the receiver into a predetermined phase to produce color images with proper tones.

Another object of this invention is to provide an automatic tint control circuit for a color television receiver which detects a signal representing flesh tone in a transmitted chrominance signal and provides the detected signal with a predetermined phase.

Still another object of this invention is to provide an automatic tint control circuit for a color television receiver which detects signals in a predetermined phase area and in a predetermined saturation area and provides the detected signals with a predetermined phase.

Other objects, features and advantages of this invention will become apparent from the following description taken in conjunction with the accompanying drawings.

DESCRIPTION OF THE PREFERRED EMBODIMENTS

Figure 1:
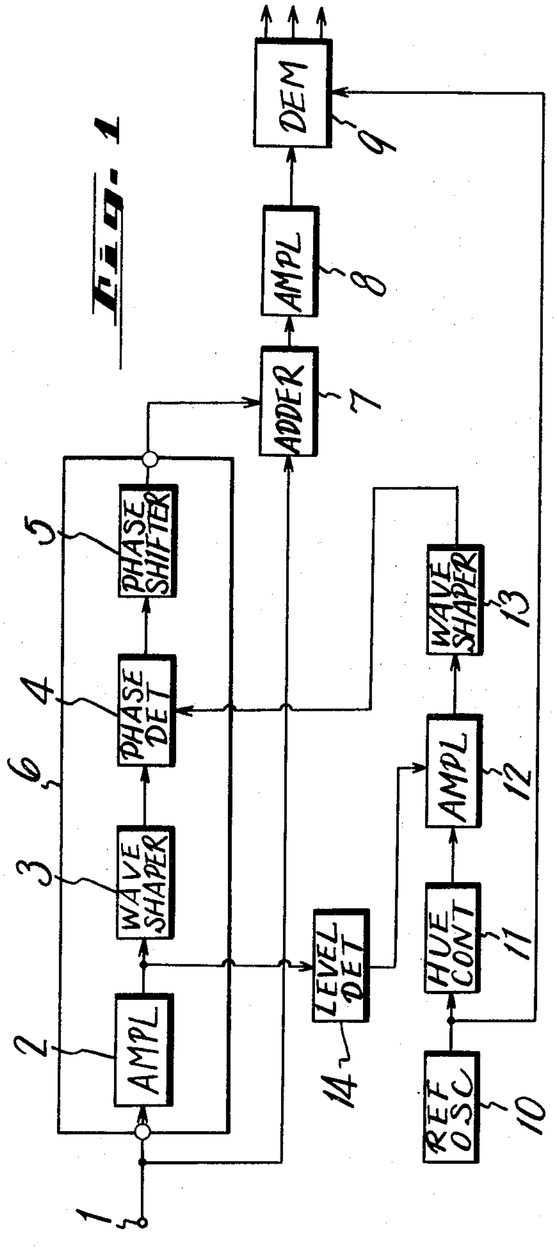
FIG. 1 is a block diagram showing one example of an automatic tint control circuit of this invention.
Figure 2:
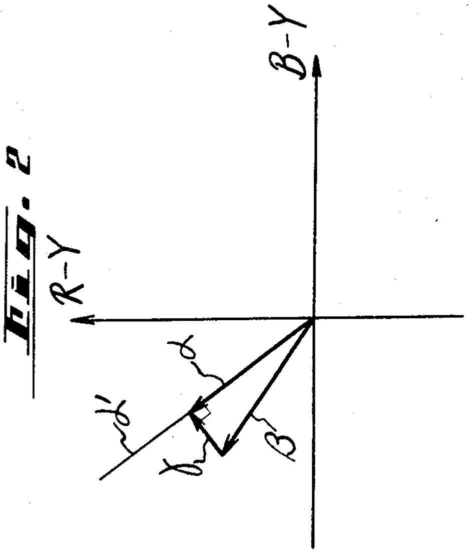
FIGS. 2 and 3 are diagrams for explaining the operation of the automatic tint control circuit of this invention.

The automatic tint control circuit of this invention will be described with reference to FIG. 1. A chrominance signal separated from a composite color television signal is applied to a terminal 1. The chrominance signal is produced, as usual, by amplitude modulating a color carrier signal of a predetermined frequency, for example, 3.58MHz with two modulation axes perpendicular to each other, for example, R-Y and B-Y axes. The chrominance signal fed to the terminal 1 is amplified by an amplifier 2 and shaped by a wave shaping circuit 3 to be of a predetermined waveform. Thereafter it is applied to a phase detector circuit 4 and then to a phase shifter 5. These circuits make up a tint correction circuit 6. The signal at terminal 1 is also applied through an adder 7 to a bandpass amplifier 8 to be amplified, and is thereafter supplied to a color demodulator 9 to be demodulated into respective color signals. A reference signal derived from a reference oscillator 10 which, as is conventional, may have its frequency controlled by the burst signal, is controlled by a hue control circuit 11 to be a signal of a predetermined phase, for example, corresponding to flesh tone, and is supplied through an amplifier 12 to a wave shaping circuit 13. The wave shaping circuit 13 produces, from the reference signal, a pulse-shaped signal having a phase corresponding to flesh tone, and this signal is applied to the phase detector circuit 4. Accordingly, in the phase detector circuit 4 the chrominance signal from the wave shaping circuit 3 is detected with the phase corresponding to flesh tone and the detected output has a level that corresponds to the difference between the phase of the chrominance signal and that corresponding to the flesh tone. That is, in a predetermined phase area of, for example, ± 10° centering about the phase corresponding to the flesh tone, the level of the detected output rises as the phase of the chrominance signal goes away from that corresponding to the flesh tone; when the phase of the chrominance signal lies outside of the above phase area, no detected output is derived from the phase detector circuit 4. The detected output is phase-shifted by the phase shifter circuit 5 to a phase perpendicular to the phase axis corresponding to the flesh tone to provide a correcting signal, which is added by the adder 7 to the chrominance signal fed thereto from the terminal 1. As a result of this, the compound chrominance signal has a phase corresponding to proper flesh tone as shown in FIG. 2. In the figure, reference character $\alpha'$ indicates the phase corresponding to the flesh tone, $\alpha$ the corrected chrominance signal, $\beta$ the chrominance signal to be corrected, and $\gamma$ the correcting signal.

Figure 3:
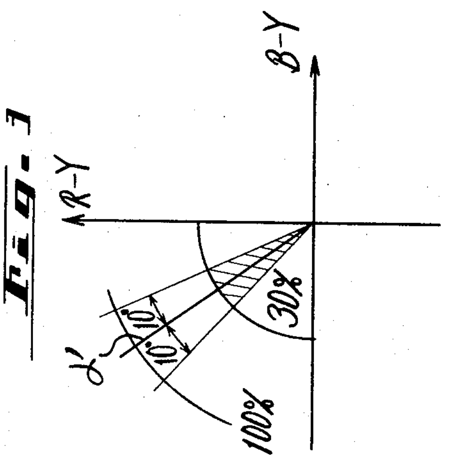

A level detector circuit 14 is provided for detecting the saturation of the chrominance signal derived from the terminal 1 and a detected output corresponding to the saturation of the chrominance signal is applied to the amplifier 12 to control the reference signal. Thus, if the chrominance signal has a saturation of, for example, more than 30 percent, at which the chrominance signal cannot represent a flesh tone, the detected output derived from the level detector circuit 14 controls the amplifier 12 to prevent the reference signal from being supplied to the phase detector 4. Accordingly, no correcting signal is produced and the phase of the chrominance signal is not changed. Thus, only those chrominance signals having a phase in the phase area of, for example, ± 10° about the phase corresponding to the flesh tone and having saturation lower than 30 percent, for example, are corrected to be of the phase corresponding to proper flesh tone. Chrominance signals having a saturation higher than 30 percent are not shifted in phase, even if their phase is in the aforementioned phase area. The shaded area in FIG. 3 is the area in which the chrominance signals can be corrected to have a phase corresponding to a proper flesh tone. In the figure, reference character $\alpha'$ indicates the phase corresponding to the flesh tone and the radial dimension indicates the saturation. As has been described above, the present invention removes the defect that the signals representing other tints than the flesh tone are caused to represent the flesh tone.

Referring now to FIGS. 4, 5, 6, and 7, one example of a circuit operating according to this invention will be described.

In the illustrated example, a chrominance signal fed to the input terminal 1 is supplied to the base of a transistor amplifier 15. An output chrominance signal from the emitter is applied to the phase detector circuit 9 through the adder 7, a circuit 41 for changing signal impedance, and the bandpass amplifier 8.

Figures 5A, 5B, 5C, 5D, 5E:
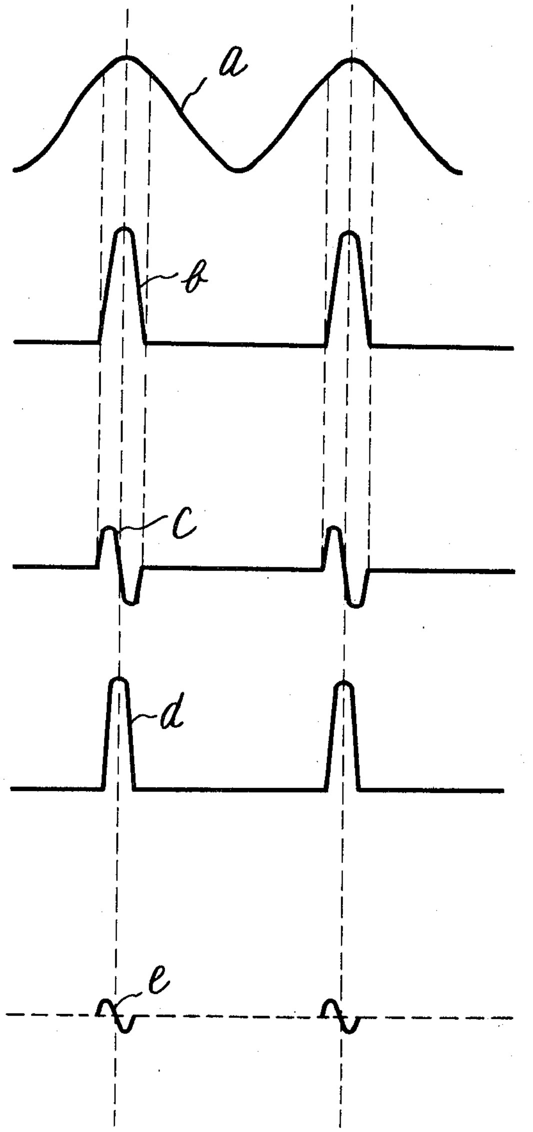
FIGS. 5A, 5B, 5C, 5D, 5E, 6A, 6B, 6C, and 7A, 7B, 7C are waveform diagrams for explaining the example depicted in FIG. 4.

From the collector of the transistor 15 the amplified chrominance signal is fed to a circuit 16 for detecting and separating the peak portion of the chrominance signal. The circuit 16 is made up of a transistor 17, a parallel circuit consisting of a resistor 18 and a capacitor 19 connected to the emitter of the transistor 17, a series circuit consisting of a resistor 20 and a diode 21 connected between the base of the transistor 17 and ground, and a load resistor 22 connected between the collector of the transistor 17 and a positive power source +B. In the circuit 16 only the peak portion of a color carrier signal *a*, such as is shown in FIG. 5A, which forms the chrominance signal is amplified to derive at the output side of the circuit 16 a pulse-shaped signal *b*, such as is depicted in FIG. 5B.

The output of the circuit 16 is supplied to a wave reforming circuit 23 to provide an S-shaped waveform signal. The circuit 23 is made up of a transformer 26 having a primary winding 24 connected in parallel with the load resistor 22 and a secondary winding 25 to constitute the so-called differentiating circuit to produce, at both ends of the secondary winding 25, differentiated outputs of opposite polarities such as shown in FIG. 5C, namely the S-shaped waveform signals *c*. The circuits 16 and 23 make up generally the wave shaping circuit 3.

The S-shaped waveform signals *c* are supplied to the bases of transistors 27 and 28 making up a differential amplifier. The differential amplifier forms the phase detector circuit 4 which detects the phase of the S-shaped waveform signal *c* with a reference phase. The emitters of the transistors 27 and 28 are interconnected through resistors 29 and 30, respectively, and the connection point between these resistors is connected to an output transistor 32 of a circuit 31 for producing a reference signal for phase detecting use.

The reference signal producing circuit 31 is supplied at its input terminal 33 with a reference signal of, for example, 3.58MHz which is produced by a reference oscillator (not shown). The peak portion of, for example, the positive side of the reference signal is caused to agree with the flesh tone phase axis by the hue control circuit 11 consisting of a coil 34 and a variable resistor 35 and is amplified by a transistor 36. The reference signal thus modified, or controlled, is supplied to the output transistor 32. The output transistor 32 is held in a non-biased condition and is adapted to turn on at a level lower than a predetermined one near the peak value of the signal supplied thereto to produce a pulse signal *d*, such as depicted in FIG. 5D. With the pulse signal *d* the S-shaped waveform signal *c* is detected in phase to derive, at the primary side of an output transformer 37 of the differential amplifier, a detected output *e* such as is indicated by solid lines in FIG. 5E. The phase area of the chrominance signal to be corrected is determined by the width of the pulse signal *d*, and in the present invention this phase area is determined to be approximately ± 10° about the flesh tone phase.

The chrominance signal *a* in FIG. 5A is shown to coincide completely with the flesh tone phase. In this case, the input to the output transformer 37, namely to the adder 7, is zero in terms of DC as indicated by broken lines in FIG. 5E, and the correcting value is zero, so that the chrominance signal fed to the adder 7 is supplied without change to the signal impedance changing circuit 41.

In the event that the phase of the chrominance signal is advanced relative to the correct flesh tone phase and the zero point of the S-shaped waveform signal *c* is ahead of the flesh tone phase, as is shown in FIG. 6A, the signal $c$ is detected by the reference signal $d$ of FIG. 6B to derive, at the primary side of the output transformer 37, a negative detected output $e'$, such as depicted in FIG. 6C. In this case, by connecting a capacitor 38 and a resistor 39 in parallel with the primary winding of the output transformer 37 and by selecting their resonance frequency to be equal to the color carrier frequency, a signal based on the phase of the detected output $e'$, namely a correcting signal $e_c$, such as is indicated by a broken line in FIG. 6C, is induced in the secondary winding of the output transformer 37, and the correcting signal $e_c$ is added vectorially to the chrominance signal to shift the phase of the latter toward the proper flesh tone phase.

Figures 6, 7:
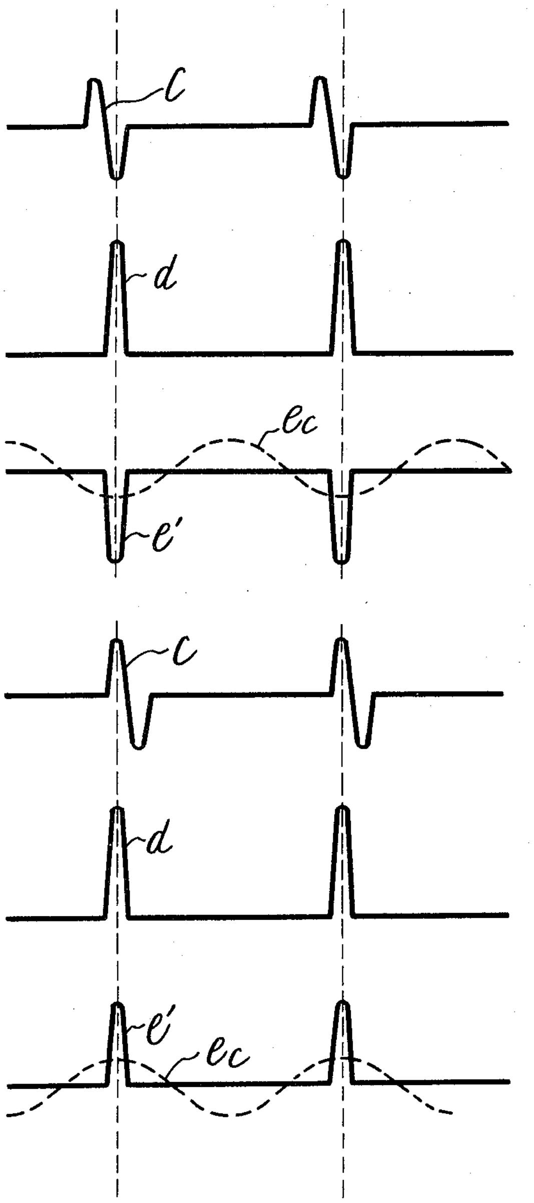

When the phase of the chrominance signal is delayed behind the proper flesh tone phase and the zero point of the S-shaped waveform signal $c$ is delayed behind the flesh tone phase, as is shown in FIG. 7A, the signal $c$ is detected by the reference signal $d$ depicted in FIG. 7B to produce a positive detected output $e'$, such as is shown in FIG. 7C. In this case, the correcting signal $e_c$ added to the secondary side of the output transformer 37 is opposite in phase to that in the case of FIG. 6 and the phase of the chrominance signal passing through the adder 7 is corrected by the correcting signal $e_c$ to be advanced so as to be shifted in the direction of the proper flesh tone phase. If the S-shaped waveform signal is outside of the width of the reference signal, namely when the phase of the chrominance signal is greatly different from the flesh tone phase, no phase detected output is produced and the correcting signal $e_c$ is not formed.

In the manner described above, flesh tone correction is achieved. In the present invention, when the amplitude of the chrominance signal supplied to the input terminal 1 exceeds a certain set value, for example, 30 percent in terms of color saturation, the amount of correction added to the chrominance signal through the adder 7 is reduced to some extent or to zero, or is held so as not to increase.

Figure 4:
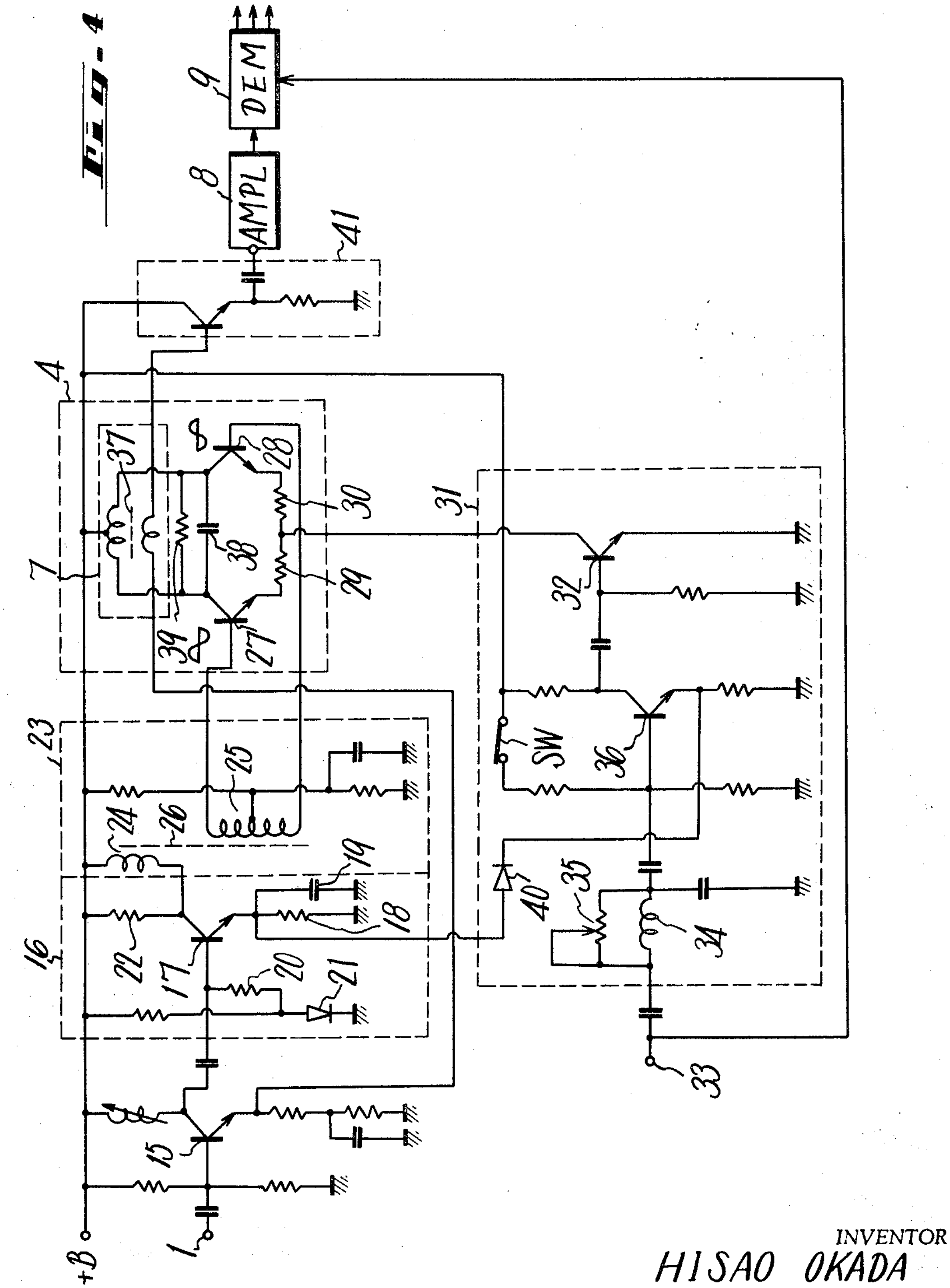
FIG. 4 is a schematic circuit diagram illustrating one example of the automatic tint control circuit of this invention.

To perform this, in the circuit of FIG. 4 a diode 40 is connected to the emitter of the transistor 17 to detect the amplitude of the chrominance signal, and the detected output is applied as a saturation detecting signal to the emitter of a transistor 36. Thus, when the amplitude of the chrominance signal fed to the input terminal 1 exceeds a predetermined value, the emitter potential of the transistor 17 rises to a level at which the diode 40 conducts. Conduction through the diode raises the emitter potential of the transistor 36, so that the transistor 36 is reversely biased, and this lowers the amplification of the transistor. Therefore, the amplitude of the reference signal fed to the transistor 32 is decreased, which shortens the conduction time of the transistor 32, and the detected output derived from the phase detector circuit 4 decreases with an increase in the saturation of the chrominance signal to reduce the amount of correction. For example, when the saturation exceeds 30 percent, the amount of correction is reduced to substantially zero. That is, as the amplitude of the chrominance signal increases, corresponding to an increase in saturation, sensitivity for detecting the correcting signal lowers and no correcting operation is performed.

Accordingly, even if the chrominance signal is of the same phase as the flesh tone phase, when its color saturation exceeds a predetermined level, for example, 30 percent, no correcting operation is carried out, thus eliminating the undesired effects attendant upon the provision of the automatic flesh tone control circuit. Further, the operation of the control circuit can be stopped by turning off a switch SW.

Although the present invention has been described in connection with the case where when the amplitude of the chrominance signal exceeds a set level the amount of correction is positively reduced, the same results can be obtained by preventing any further increase of the amount of correction.

What is claimed is:

1. An automatic tint control circuit for a color television receiver adapted to receive a composite color television signal containing a chrominance signal, the phase of which represents hue and the amplitude of which represents color saturation, said circuit comprising:

A. Means supplied with the chrominance signal for producing a phase correcting signal when the phase of said chrominance signal is positioned in a predetermined phase range;

B. Detecting means for detecting the level of the chrominance signal;

C. Means for controlling said phase correcting signal producing means in accordance with a level-detected input of said detecting means so that said phase correcting signal is produced only when the detected level of the chrominance signal is below the maximum level corresponding to the color saturation for flesh tones; and D. Means for adding said phase correcting signal to the chrominance signal to provide the chrominance signal with a predetermined phase corresponding to the hue of flesh tones only when the chrominance signal has its phase positioned in said predetermined phase qrea and its level below said maximum level.

2. An automatic tint control circuit in accordance with claim 1, in which said maximum level substantially corresponds to about 30 percent color saturation.

3. An automatic tint control circuit in accordance with claim 1, in which said phase correcting signal producing means comprises:

A. Means for producing a reference signal having a phase corresponding to a predetermined hue;

B. Means for reforming the waveform of the chrominance signal;

C. Means for phase-detecting the reformed chrominance signal with said reference signal; and D. Means for producing, from the output of said phase-detecting means, a signal of a phase bearing a fixed relation to the phase of said reference signal.

4. An automatic tint control circuit in accordance with claim 3, in which said predetermined phase range includes the phase of said reference signals and signals within approximately 10° thereof.

5. An automatic tint control circuit in accordance with claim 4, in which said signal produced from the output of said phase-detecting means is provided with a phase perpendicular to the phase axis of said reference signal.

6. An automatic flesh tone control circuit for a color television receiver adapted to receive a composite color television signal containing a chrominance signal the phase of which represents hue and the amplitude of which represents color saturation, said circuit comprising:

A. Means for producing a reference signal having a phase corresponding to a hue of flesh tone;

B. Means for reforming the waveform of the chrominance signal;

C. Means for phase-detecting the reformed chrominance signal with said reference signal;

D. Means for producing a phase correcting signal from the output of said phase-detecting means when the phase of the chrominance signal is adjacent to the reference signal;

E. Means for detecting the level of the chrominance signal;

F. Means for controlling said phase-detecting means in accordance with the output of said level detecting means so as to deactivate said phase-detecting means and thereby avoid production of said phase correcting signal when the level of the chrominance signal exceeds thn level corresponding to maximum color saturation for flesh tones; and G. Means for adding said phase correcting signal to the chrominance signal, thereby to provide the chrominance signal with the phase representing proper flesh tone only when the chrominance signal has a phase adjacent to the phase of flesh tone and a level less than said level corresponding to the maximum color saturation for flesh tones.

* * * * *